July 30, 1946.                J. P. LAICO ET AL                    2,404,802
                          ELECTRON DISCHARGE DEVICE
                              Filed May 25, 1940

INVENTORS: J. P. LAICO
           V. L. RONCI
BY
    Stanley B. Kent
              ATTORNEY Patented July 30, 1946

2,404,802

UNITED STATES PATENT OFFICE 2,404,802

ELECTRON DISCHARGE DEVICE

Joseph P. Laico and Victor L. Ronci, Brooklyn, N. Y., assignors to Bell Telephone Laboratories, Incorporated, New York, N. Y., a corporation of New York Application May 25, 1940, Serial No. 337,186

16 Claims. (Cl. 250—165)

This invention relates to electron discharge devices and more particularly to photoelectric tubes.

An object of the invention is to provide an improved electron discharge device, such as a photoelectric tube, which is particularly compact.

In an example of practice illustrative of the invention, a hollow sheet metal cathode in the form of a truncated cone, a ring-shaped anode and a metallic cup for holding a caesium producing reactive mixture is provided in coaxial alignment within a small, generally cylindrical glass container. The cathode surface is of pure silver which in the process of sensitizing is oxidized and treated with caesium vapor under suitable temperature conditions. A mica disc is provided between the cathode and the caesium cup to deflect the hot caesium vapor, as it is produced, away from the oxidized surface of the cathode toward the inside walls of the container in order to prevent injury to the oxidized surface of the cathode. This mica disc is of a size to provide an annular space between its periphery and the glass container for the uniform migration of the caesium to the cathode surface. A second mica disc is positioned between the caesium cup and the glass container. This mica disc is pre-fired in hydrogen at a temperature of approximately 1000° C. in order to render it opaque to infra-red rays produced when the caesium cup is heated during the reaction of the caesium producing mixture. This second disc prevents injurious heating of the molded glass dish-shaped end of the container adjacent to the caesium cup which end is hereafter called the stem because it is the portion of the container through which support wires and lead-in wires for the electrode structure are sealed.

An exceptionally compact electrode structure is provided of such a form that neither the oxidized surface of the cathode nor the glass stem adjacent to the caesium cup is injured by the intense heat produced during the caesium producing reaction. The electrode assembly is entirely supported from the stem, which simplifies the process of sealing it within the cylindrical portion of the container. The exhaust tubulation is connected to a reentrant portion of the end of the container adjacent to the cathode after assembly, which permits a normal length of exhaust tubing after seal-off without increasing the over-all length of the container and is advantageous in properly distributing the caesium during the evacuating and baking process.

The invention will now be described more in detail having reference to the accompanying drawing.

Figure 1:
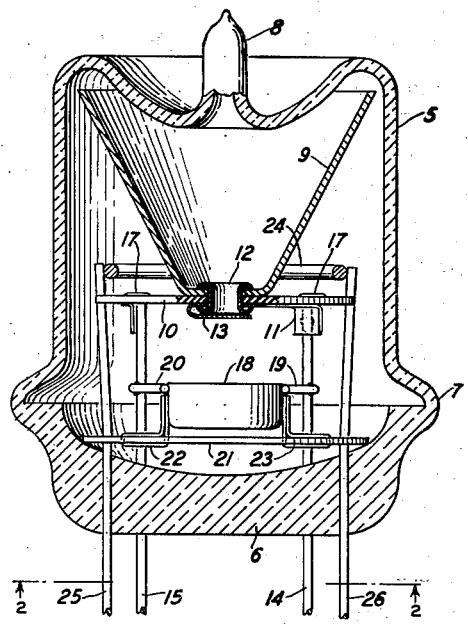
Fig. 1 is a longitudinal section of the preferred embodiment of the invention.
Figure 2:
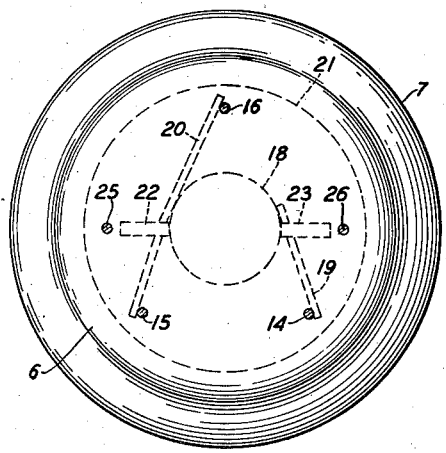
Fig. 2 is an end view, looking toward the stem end, of the embodiment of Fig. 1.

The preferred embodiment of the invention in the form of a photoelectric tube is illustrated in Figs. 1 and 2 and comprises a generally cylindrical glass container formed in two parts. The molded dish stem 6 below the glass ring seal 7 carrying the electrode assembly constitutes one part and the cylindrical portion 5 above the ring seal 7 with the exhaust tubulation seal-off 8 constitutes the other portion. The seal-off 8 is on a reentrant portion at the end of the cylindrical portion 5, thus permitting a normal length of seal-off without increasing the over-all length of the container. This container in an actual photoelectric tube embodying this invention is approximately one inch in diameter and one and one-half inches long.

Cathode 9 is preferably formed from substantially pure silver in the shape of a truncated cone, the convex surface of the cathode in the completed tube being photoelectrically sensitive. The small end of the cathode is turned over to fit against one face of a mica disc 10. On the opposite face of the disc 10 is a one-eighth inch nickel ribbon 11 which is used as a part of the lead-in connection to the cathode. The cathode 9, mica disc 10 and ribbon 11 are clamped together and secured by a nickel eyelet 12. An extension 13 of the nickel ribbon 11 is folded back covering the hole through the eyelet 12. The mica disc 10 carrying the cathode 9 is supported from the ends of cathode lead-in wire 14 and support wires 15 and 16. Mica disc 10 is secured to the wires 14, 15 and 16 by nickel staples 17 which pass through the mica disc and are welded to the sides of the wires. Eyelets in the mica disc 10 through which the wires 14, 15 and 16 pass, may be used instead of staples. These wires are sealed through the molded dish stem 6. The ribbon 11 is formed partly around the wire 14 as shown and welded thereto.

Caesium for sensitizing the cathode is preferably produced by chemical reaction of a mixture in the form of a so-called caesium pellet. This pellet is mounted in a metallic cup 18 with the open end toward the cathode. The pellet is held within the cup by a piece of nickel wire gauze. The cup 18 is supported from the wires 14, 15 and 16 by nickel wires 19 and 20 which are welded to the wires 14, 15 and 16 and to the sides of the cup 18. Wire 19 is welded to wire 14. Wire 20 is welded to the wires 15 and 16. When the chemical reaction of the caesium pellet takes place, a large amount of heat is generated. In an actual tube embodying this invention it is necessary to place the caesium cup 18 close to the stem 6. In fact, it must be placed so close that the stem would be injured if means were not provided to prevent such injury. For this purpose another mica disc 21 is positioned intermediate the cup 18 and the stem 6. This mica disc 21 is supported from the cup 18 by two nickel staples 22 and 23 which pass through holes in the disc 21 and are welded to the sides of the cup 18. Wires 14, 15 and 16 pass through holes in the disc 21 and do not touch the disc.

The mica disc 21 is pre-fired in hydrogen at approximately 1000° C., and subsequently pressed between plane surfaces. Since the mica increases its thickness approximately eightfold during the firing, it has to be pressed back to its approximate original thickness in order to regain its mechanical strength. The firing process renders the mica opaque to the transmission of infra-red light, thus effecting a sharp temperature gradient between the cup 18 and the glass dish stem 6 during the time that the caesium pellet is reacting.

The anode 24 is a nickel ring surrounding the cathode 9 near its small end. Anode 24 is supported by lead-in wires 25 and 26 sealed through the molded dish stem 6. These wires pass through holes in mica discs 10 and 21 and are not in contact with either mica disc so that any deposit of caesium on the mica surfaces does not affect the electrical insulation between the anode and the cathode. Mica disc 21 further serves as a baffle to prevent caesium from being deposited on the glass in the vicinity of the lead-in wires.

The cathode may be sensitized in any well-known manner after the tube structure has been fabricated. A preferred method is very similar to that described in Patent No. 2,178,227 of M. S. Glass, patented October 31, 1939. The method therein described is modified to take into account the difference in size of the cathode and the fact that in the photoelectric tube of the present invention the caesium cup 18 and the conical cathode 9 are coaxial.

Briefly described the preferred method of sensitizing the cathode is as follows:

The tube is baked at about 400° C., to remove occluded gases from the bulb but this heating does not cause any chemical reaction in the caesium pellet. Oxygen is admitted into the container and the cathode is subjected to ionic bombardment in such a way that the first effect is to produce a heavy layer of silver oxide on the convex surface of the conical cathode 9 followed by the heating up of the silver cathode and reduction of the layer of silver oxide. This cycle of oxidation and reduction is repeated, after which the oxygen is pumped out of the container. This treatment leaves the convex surface of the cathode clean and slightly rough so that it has a uniform matte finish. A fresh charge of oxygen is admitted and by a succession of discharges of fixed amounts of electricity from condensers, the convex surface of the cathode is oxidized to an amount depending upon the amount of caesium to be introduced. The caesium pellet is then inductively heated to effect a chemical reaction which produces caesium vapor. The high frequency coil used for inductively heating the caesium cup 18 is positioned around the stem 6 with the upper end of the coil at approximately the level of the cup 18. In order to protect the cathode 9 from induced currents, a short-circuiting turn in the form of a short length of copper tubing is placed around the cylindrical portion 5 of the container with the lower end at approximately the level of the mica disc 10. The caesium vapor produced by the chemical reaction condenses primarily on the inner walls of the glass container and is prevented from directly striking the oxidized surface of the silver cathode 9 by the mica disc 10. The disc 10 is of such diameter that an annular space is provided between the periphery of the disc and the glass bulb for the uniform migration of the caesium to the cathode surface. The container is then heated in a stream of hot air to a temperature of about 225° C., until the cathode has reached the desired sensitivity. Argon or other suitable gases may be admitted at low pressure to obtain the benefits of gas amplification.

Other materials may be used for the cathode and modified treating methods may be employed. The cathode may consist of copper, the convex surface being silver plated. The cathode may also consist of bimetallic sheet metal of nickel and silver so formed that the silver forms the outer surface of the cathode 9. The cathode 9, because of its form, may be out-gassed by inductive heating and furthermore it may be inductively heated to reduce the heavy layer of silver oxide produced during the cleaning and roughening process mentioned hereinbefore. Other materials and modified methods are described in the Glass Patent No. 2,178,227. The ingredients of the caesium pellet are preferably those disclosed in this Glass patent; namely, caesium chromate, chromic oxide and powdered aluminum. These ingredients are carefully prepared, finely pulverized and thoroughly mixed in proper proportions before being formed into pellets.

What is claimed is:

1. An electron discharge device comprising an evacuated container, a cathode at one end of said container, an anode in operative relation to said cathode, a support for cathode sensitizing material at the other end of said container, a heat-resisting baffle supported intermediate said photo-cathode and said support, and a second heat-resisting baffle intermediate the said support and the adjacent end of the evacuated container.

2. A photoelectric tube comprising an evacuated container, a cathode at one end of said container, an anode in operative relation to said cathode, a support for light sensitive material at the other end of said container, a heat-resisting baffle supported intermediate said cathode and said support, a second heat-resisting baffle intermediate the said support and the adjacent end of the evacuated container, and an exhaust tubulation connected to said container at the end adjacent to said cathode.

3. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, and an anode supported by other of said support wires.

4. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, and a metallic cup also supported from said mica disc support wires on the side of the disc opposite from said cathode with the opening of the cup toward said disc, said cup having held a mixture which gave caesium vapor when heated.

5. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, a metallic cup also supported from said mica disc support wires on the side of the disc opposite from said cathode with the opening of the cup toward said disc, said cup having held a mixture which gave caesium vapor when heated, and a second mica disc supported between the said cup and the adjacent end of the container but out of contact with both.

6. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, a metallic cup also supported from said mica disc support wires on the side of the disc opposite from said cathode with the opening of the cup toward said disc, said cup having held a mixture which gave caesium vapor when heated, and a second mica disc supported between the said cup and the adjacent end of the container but out of contact with both, said second mica disc having been pre-heated to a temperature in the neighborhood of 1000° C. to render it opaque to infra-red rays produced when said cup is heated during the production of caesium vapor.

7. A photoelectric cathode assembly comprising a truncated cone of sheet metal the convex surface of which is silver for serving as cathode support, a mica disc approximately as large as the base of said cone, an eyelet securing the small end of said cone to the center of said disc, a glass stem, a plurality of wires sealed in said stem, and means supporting said mica disc from a plurality of said wires.

8. A photoelectric cathode assembly comprising a truncated cone of sheet metal the convex surface of which is silver for serving as cathode support, a mica disc approximately as large as the base of said cone, an eyelet securing the small end of said cone to the center of said disc, a glass stem, a plurality of wires sealed in said stem, means supporting said disc from said plurality of wires, and a metallic cup positioned on the side of said mica disc opposite to said cone and supported by wires secured to said plurality of wires, said cup containing a reactive mixture for giving light sensitive metal.

9. A photoelectric cathode assembly comprising a truncated cone of sheet metal the convex surface of which is silver for serving as cathode support, a mica disc approximately as large as the base of said cone, an eyelet securing the small end of said cone to the center of said disc, a molded glass dish stem, a plurality of wires sealed in said stem, means supporting said disc from a plurality of said wires, other wires secured to said plurality of wires on the side of said mica disc opposite to said cone, a metallic cup containing a reactive mixture for producing light sensitive metal supported by said other wires, a second mica disc pre-fired at approximately 1000° C. located between said cup and said glass stem out of contact with both, and staples extending through said second disc and welded to said cup holding said second disc in position.

10. An electron discharge device comprising an evacuated container, a stem carrying an electrode assembly including a hollow electrode and respectively sealed into and closing one end of said container, and a reentrant portion extending into said hollow electrode at the opposite end of said container and respectively carrying a normal length of exhaust tubulation after seal-off.

11. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, and a metallic holder also supported from said mica disc support wires on the side of the disc opposite from said cathode with an opening towards said disc, said holder having held a mixture which gave caesium vapor when heated.

12. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, a metallic holder also supported from said mica disc support wires on the side of said disc opposite from said cathode with an opening towards said disc, said holder having held a mixture which gave caesium vapor when heated, and a second mica disc supported between the said holder and the adjacent end of the container but out of contact with both.

13. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, and a metallic cup also supported from said mica disc support wires on the side of the disc opposite from said cathode with the opening of the cup towards said disc, said cup holding a mixture for giving caesium vapor when heated.

14. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, a metallic cup also supported from said mica disc support wires on the side of the disc opposite from said cathode with the opening of the cup towards said disc, said cup holding a mixture for giving caesium vapor when heated, and a second mica disc supported between said cup and the adjacent end of the container but out of contact with both.

15. A photoelectric tube comprising a glass container of generally cylindrical shape, a plurality of support wires sealed through one end of said container, a mica disc supported from certain of said wires in a position transverse of said container, a photo-cathode in the shape of a truncated cone supported at its small end on said mica disc and having its large end closely adjacent to the end of the container away from the sealed wires, an anode supported by other of said support wires, a metallic cup also supported from said mica disc support wires on the side of the disc opposite from said cathode with the opening of the cup towards said disc, said cup holding a mixture for giving caesium vapor when heated, and a second mica disc supported between the said cup and the adjacent end of the container but out of contact with both, said second mica disc having been preheated to a temperature in the neighborhood of 1000° C. to render it opaque to infra-red rays produced when said cup is heated during the production of caasium vapor.

16. A photoelectric tube comprising a generally cylindrical container having end closing portions, a hollow photoelectrically sensitive cathode supported close to one end of said container, the end portion of said container adjacent said cathode having an annularly depressed portion located within said cathode, a seal-off tip formed at the center of said depressed portion, and an anode in operative relationship to said cathode.

JOSEPH P. LAICO.
VICTOR L. RONCI.